(12) United States Patent
Narzisi et al.

(10) Patent No.: US 8,015,127 B2
(45) Date of Patent: Sep. 6, 2011

(54) SYSTEM, METHOD, AND COMPUTER-ACCESSIBLE MEDIUM FOR PROVIDING A MULTI-OBJECTIVE EVOLUTIONARY OPTIMIZATION OF AGENT-BASED MODELS

(75) Inventors: Giuseppe Narzisi, Syracuse (IT); Bhubaneswar Mishra, Great Neck, NY (US); Venkatesh Mysore, Piscataway, NJ (US)

(73) Assignee: New York University, New York, NY (US)

( * ) Notice: Subject to any disclaimer, the term of this patent is extended or adjusted under 35 U.S.C. 154(b) by 948 days.

(21) Appl. No.: 11/854,468

(22) Filed: Sep. 12, 2007

(65) Prior Publication Data

US 2008/0215512 A1 Sep. 4, 2008

Related U.S. Application Data

(60) Provisional application No. 60/844,399, filed on Sep. 12, 2006.

(51) Int. Cl.
*G06F 15/18* (2006.01)
*G06N 3/00* (2006.01)
*G06N 3/12* (2006.01)

(52) U.S. Cl. .......................................................... 706/13

(58) Field of Classification Search ...................... 706/13
See application file for complete search history.

(56) References Cited

U.S. PATENT DOCUMENTS

2005/0216182 A1* 9/2005 Hussain et al. ................ 701/200

OTHER PUBLICATIONS

Deb "A Fast and Elitist Multiobjective Genetic Algorithm: NSGA-II", IEEE Tran. EC, vol. 6, No. 2, 2002, pp. 182-197.*
Jin et al. Trade-off between Performance and Robustness: An Evolutionary Multiobjective Approach, Published in: Evolutionary Multi-Criterion Optimization, LNCS 2632, 2003, pp. 237-252.*
Veldhuizen et al. "Considering in Engineering Parallel Multiobjective Evolutionary Algorithms", IEEE TEC, vol. 7, No. 2, 2003, pp. 144-173.*
Zitzler et al. "Multiobjective Evolutionary Algorithms: A Comparative Case Study and the Strength Pareto Approach", IEEE TEC, vol. 3, No. 4, 1999, pp. 257-271.*
Abbas, et al. "Optimization of Time of Day Plan Scheduling Using a Multi-Objective Evolutionary Algorithm", Transportation Research Board, 84th Annual Meeting, 2005, pp. 1-20.*

* cited by examiner

*Primary Examiner* — Michael B Holmes
*Assistant Examiner* — Li-Wu Chang
(74) *Attorney, Agent, or Firm* — Dorsey & Whitney LLP

(57) ABSTRACT

Agent-based models (ABMs)/multi-agent systems (MASs) are one of the most widely used modeling-simulation-analysis approaches for understanding the dynamical behavior of complex systems. These models can be often characterized by several parameters with nonlinear interactions which together determine the global system dynamics, usually measured by different conflicting criteria. One problem that can emerge is that of tuning the controllable system parameters at the local level, in order to reach some desirable global behavior. According to one exemplary embodiment t of the present invention, the tuning of an ABM for emergency response planning can be cast as a multi-objective optimization problem (MOOP). Further, the use of multi-objective evolutionary algorithms (MOEAs) and procedures for exploration and optimization of the resultant search space can be utilized. It is possible to employ conventional MOEAs, e.g., the Nondominated Sorting Genetic Algorithm II (NSGA-II) and the Pareto Archived Evolution Strategy (PAES), and their performance can be tested for different pairs of objectives for plan evaluation. In the experimental results, the approximate Pareto front of the non-dominated solutions is effectively obtained. Further, a conflict between the proposed objectives can be seen. Additional robustness analysis may be performed to assist policy-makers in selecting a plan according to higher-level information or criteria which is likely not present in the original problem description.

26 Claims, 8 Drawing Sheets

SYSTEM, METHOD, AND COMPUTER-ACCESSIBLE MEDIUM FOR PROVIDING A MULTI-OBJECTIVE EVOLUTIONARY OPTIMIZATION OF AGENT-BASED MODELS

CROSS-REFERENCE TO RELATED APPLICATION(S)

This application claims priority from U.S. Patent Application Ser. No. 60/844,399, filed Sep. 12, 2006, the entire disclosure of which is incorporated herein by reference.

STATEMENT REGARDING FEDERALLY SPONSORED RESEARCH

The present invention was made with U.S. Government support under Contract No. 2204-GT-TX-00016 awarded by the Department of Homeland Security. Thus, the U.S. Government has certain rights in the invention.

FIELD OF THE INVENTION

The present invention relates generally to methods, systems and computer-accessible media for optimizing systems of interacting boundedly rational agents with respect to multiple objectives.

INTRODUCTION

The development and use of agent-based simulations has seen significant growth in the last few years, including applications to social science, biology and several other real-world domains. Such simulations are described, e.g., in "Adaptive Agents, Intelligence, and Emergent Human Organization: Capturing Complexity through Agent-Based Modeling," PNAS volume 99(3) (May 2002).

In such simulations, a system may be modeled as a collection of autonomous decision-making entities called "agents." A large multi-agent system can produce very complex dynamics even if the individual agents and/or their interactions follow simple rules of behavior. These emergent behaviors may be even more unpredictable and even counter-intuitive, for example, if the agents are embedded in, and interact in, a real-world environment which can introduces more communication channels, constraints and behavior rules.

For example, a rational agent, in the field of game theory, can be an agent which always selects globally optimal strategies. A boundedly rational agent, on the other hand, may be constrained by information and computational resources, and hence may opt for reasonably good strategies which may often be globally sub-optimal. A boundedly rational agent can better reflect the real behavior of human agents as compared with a classic rational agent, and thus such boundedly rational agents may be of more importance to modelers and researchers in different fields using Agent-based models ("ABMs"). However, due to sub-optimality strategy selections of such agents and their possible random behavior, the analysis and accounting for their behavior and the global effects of such behavior in a system not always be apparent or easy. The interaction between such boundedly rational agent agents can be viewed as an example of an adaptive complex system.

ABMs can often be characterized by several parameters that can exhibit nonlinear interactions, which together determine the global system dynamics. It may be desirable to use an ABM to generate a system that satisfies some global behavior which can be measured by different conflicting criteria, but the model may be designed bottom-up from local perspectives of agents. Thus, certain system parameters at the local level which can govern agent rules of behavior may be tuned or adjusted in order to reach certain pre-defined global objectives.

Although such a calibration/tuning process may be useful, few attempts for generating a general method for achieving such results are described in the literature, particularly with a successful application to real-world systems. For example, certain conventional tools such as NetLogo (see, e.g., http://ccl.northwestern.edu/netlogo/) can allow a user to explore the parameter space of a system in a systematic and automatic way, but such tools can become impractical when there are many real-valued parameters.

A parameter sweep infrastructure can be used where searcher agents traverse the parameter space in search of higher "fitness" as described, e.g., in S. Brueckner et al., "Resource-aware exploration of the emergent dynamics of simulated systems," AAMAS, pp. 781-788 (2003). However, this study does not address the more complex systems which generally involve boundedly rational agents, and where the parameter space can be associated with the system within which the agents operate.

More recently, the use of evolutionary computation has been considered. For example, a single-objective genetic algorithm to explore the parameter space of a simple ant-foraging example with ten ants and tuning only two parameters of the model is described, e.g., in B. Calvez et al., "Automatic tuning of agent-based models using genetic algorithms," MABS, pp. 41-57 (2005). However, this study was likely limited to optimization with respect to a single objective, which is a much simpler procedure than attempting to optimize a multi-objective system.

A multi-objective evolutionary approach used to calibrate a simple agent-based model of a financial market, using as objectives the mean and the variance of the simulated model with respect to historical data, is described in A. Rogers et al., "Multi-objective calibration for agent-based models," 5th Workshop on Agent-Based Simulation (2004). Such calibration/tuning processes may acquire different perspectives according to the specific dynamical systems that are modeled and analyzed. Agents in this study appear to exhibit primarily deterministic behavior, and the system environment itself (e.g., the prices being set by the market maker) appears to be stochastic to a small degree.

A large amount of information may be available for describing possible models and rules of behavior for different agents involved in an agent-based model system. However, little may be known about the efficacy of such rules in the global dynamics of the system. Moreover, the criteria for the evaluation of the output of such systems can often involve the use of many different and conflicting objectives. Thus, it may be desirable to generate optimized system parameters based on interactions of agents which can exhibit bounded rational behavior (e.g., they may exhibit a certain range of responses based on local and/or incomplete information available to each agent). It may further be desirable to determine such optimization in a multi-objective system, where desirability or quality of a solution can be based on a variety of criteria including, e.g., robustness of the system.

SUMMARY OF EXEMPLARY EMBODIMENTS OF THE INVENTION

According to exemplary embodiments of the present invention, a system, method, and computer-accessible medium can be provided for determining or controlling certain parameters associated with a complex system involving societies of boundedly rational agents exhibiting probabilistic and/or stochastic rules of behavior to produce an optimal outcome, where a global dynamic of such system can be evaluated by different and optionally conflicting objectives or criteria.

Exemplary embodiments of the present invention can be used to integrate two disparate technologies, agent-based modeling and evolutionary multi-objective optimization, such that the problem of finding "good" and/or "robust" controllable or selectable system parameters (e.g., emergency response plans for public safety) can be cast as a multi-objective optimization problem ("MOOP"). Such problem can be quantitatively analyzed to determine optimal system parameters which are most likely to produce desirable goals based on the collective behavior of boundedly rational agents.

For example, exemplary embodiments of the present invention can provide multi-objective optimization of a complex dynamical system. A dynamical system to be analyzed can be chosen, and agents associated with the selected system can then be defined. Such agents can be configured to exhibit stochastic behavior by associating them with certain agent parameters and defining relationships among such parameters. The agents may be configured to act as rational agents or as boundedly rational agents.

Parameters associated with the system and constraints on the parameters can then be provided. Such parameters may, e.g., be generated arbitrarily, such that they can provide a suitable representation of the system to be analyzed, or they may be based on analysis of real-world systems. A set of system variables can also be defined. These variables can represent controllable quantities which can be varied in order to optimize the system behavior with respect to certain objectives. The set of objectives can be consistent with or complementary to each other, such that approaching one objective would tend to approach others. Alternatively, certain objectives may conflict with each other, such that one may tend to worsen as another improves.

The system can then be analyzed using a multi-objective evolutionary algorithm. Such algorithm can be used to simulate the behavior of agents over time, where the agents may interact and act within the system such that the system as a whole evolves. Such algorithm can be a genetic algorithm or any appropriate computational procedure which can be used to calculate behaviors of agents within the defined system.

Multiple simulations may be run using a particular set of system variables to average the effects of the stochastic behavior and obtain a mean behavior of the system. The variance or standard deviation in behavior may also be calculated. This variance can indicate the robustness of the system using a particular set of variables. Robustness, which can indicate a relative insensitivity of the system to variations in configurations (e.g., consistency of system behavior) may be a desirable property. The number of simulations to run for a particular set of system variables can also be selected based on the robustness, with more simulations being run if a larger variance among simulations is observed.

The results obtained by applying the multi-objective evolutionary algorithm can be used to obtain a Pareto front, which provides Pareto-optimal solutions that satisfy the multiple objectives. Two or more algorithms may be used to simulate a particular system using a set of system variables, and a Pareto front may be obtained for each algorithm.

Analysis of the Pareto fronts can then be performed, and a set of system variables associated with a Pareto front may be selected which best meets the various objectives. A variety of criteria may be used for selecting a particular set of system variables, including robustness and/or prioritization of certain objectives over other ones.

For example, in an exemplary Large-Scale Emergency Response scenario, a "good" plan can be defined in terms of a best set of rules of behavior for agents involved in a city emergency infrastructure (e.g., hospitals, on-site responder units, ambulances, etc.) such that the agents can coordinate their efforts to best mitigate the outcome of a disaster. The agents' rules can be changed and adapted by modifying the ABM parameters, if desired. In such context, disaster planning or system optimization can be viewed as adjusting the controllable parameters associated with the interactions between different classes of agents (e.g., hospitals, persons, on-site responders, ambulances, etc.) and available resources, in order to globally minimize the negative consequences of a catastrophic event.

In certain exemplary embodiments of the present invention, a system optimization procedure may address or account for some or all of the following exemplary issues:

Existence of multiple criteria for evaluation of a "good" plan;

Lack of an analytical formulation and/or clearly-defined interaction between the objectives (e.g., the objective functions may not result from an output of a standard computation, but can be based on a dynamic evolution of a complex system);

Non-linear interactions between the model parameters, where such parameters may often act at a local level of the agent rules of behavior, such that their mutual interaction is not easily predictable in the global system dynamic;

Stochastic behavior, whereby two simulations of the same system can generate different results even if they use the same initialization of parameters;

Cost of fitness evaluation, where one simulation may not be sufficient to evaluate the objective functions, and can only be considered as an isolated estimate of such functions; and Constraints which may provide, e.g., a linear ordering of certain parameters which should not be violated.

Accordingly, certain exemplary features which may be provided for a system, method, and computer-accessible medium according to exemplary embodiments of the present invention can include one or more of the following:

A) Adjusting or controlling a system involving boundedly rational agents (e.g., real human agents) to generate an optimal outcome by formulating a multi-objective optimization problem using complex system modeling and multi-objective evolutionary optimization.

B) Tuning and/or calibrating a real-world large-scale multi-agent system using a reasonable amount of computational time and resources.

C) Generating experimental proof of a conflict scenario between couples of objectives generated by an ABM using a statistical analysis of the population of candidate solutions of an evolutionary algorithm.

D) Providing a simple but effective post-process analysis to determine robustness of the generated Pareto front.

Exemplary embodiments of the present invention can have generalized applications, e.g., they may be applicable to any agent-based model. Such embodiments may be particularly useful for evaluating and understanding systems involving societies of boundedly rational agents exhibiting probabilistic and/or stochastic rules of behavior, where a global dynamic of such systems is to be evaluated based on different and potentially conflicting objectives.

Such real-world systems employing agent based models, which can be analyzed and optimized using certain exemplary embodiments of the present invention, can include, inter alia, finance and economy (e.g., market models), social simulations (e.g., for understanding human rationality and learning), military systems, flows (e.g., evacuation, traffic, and customer flow management), organizational simulation, and epidemic models (e.g., Smallpox, SARS, etc).

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF EXEMPLARY EMBODIMENTS

When an optimization problem involves more than one objective function, the task of finding one or more optimum solutions can be referred to as a Multi-Objective Optimization Problem ("MOOP"). In such problems characterized by more than one conflicting objective, there may be no single optimum solution; instead, there may exist a set of solutions which are all optimal. This set of solutions can be referred to as an optimal Pareto front.

Figure 1:
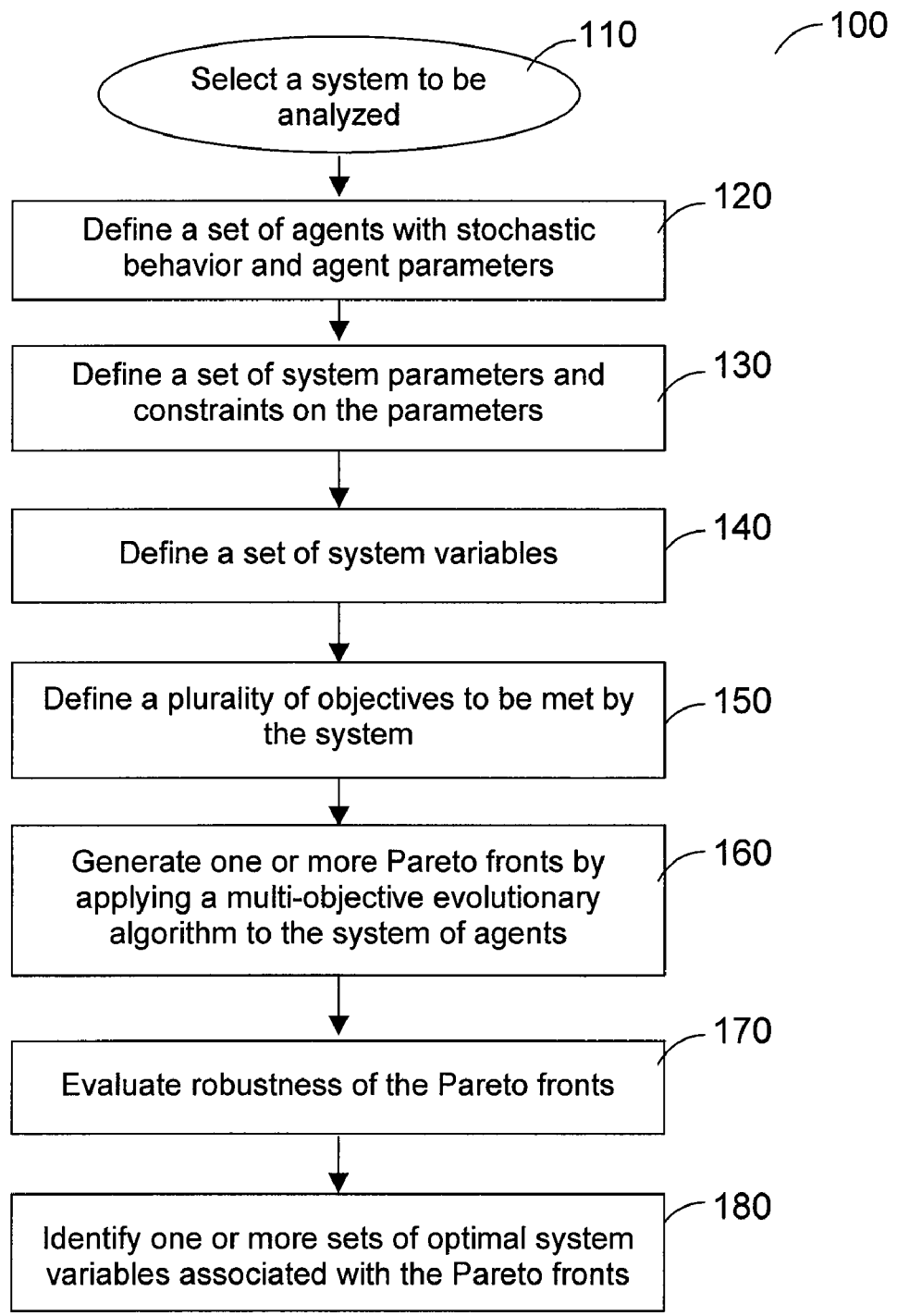
FIG. 1 is an exemplary high-level flow diagram of a modeling and optimization method in accordance with one exemplary embodiment of the present invention.

An exemplary flow diagram of a method 100 according to one exemplary embodiment of the present invention is shown in FIG. 1. For example, a dynamical system to be analyzed can be defined (step 110). Such a system can include, e.g., a disaster scenario, a military operation, a marketing strategy, traffic flow, etc.

Agents associated with the selected system can then be defined and provided (step 120). Such agents can be provided with parameters which allow them to exhibit stochastic behavior. Further, they may be configured to act as rational agents, e.g., they may exhibit one of several behaviors in response to information obtained from the system state. Such agents may further be configured to act as boundedly rational agents, e.g., their behavior may be based on incomplete information about the system. Such incomplete information may include, e.g., information that is locally accessible to the agent within the system, or a subset of information which is communicated to the agent. Examples of such behaviors are discussed in more detail herein below. Global evolution of a dynamical system using boundedly rational agents can be difficult to understand or predict using analytical approaches because of the increasing complexities in behaviors and interactions as the system evolves.

A set of system parameters and constraints on the parameters can then be defined (step 130). For example, a system for modeling traffic flow can include parameters such as the layout and interconnectedness of roads, roadway widths, weather conditions (which can affect, e.g., visibility and average speed), locations for traffic lights and traffic signs, etc. Constraints on these system parameters can also be defined. Such constraints can include, e.g., the presence of one-way streets, maximum number of traffic lanes in a road, etc.

A set of system variables can also be defined (step 140). Such variables can represent quantities which may be varied to affect the system, and to optimize a plurality of objectives. For example, variables associated with the system for modeling traffic flow can include duration of red and green traffic light signals, timing of such signals among adjacent intersections, placing traffic signs instead of traffic lights at a location, etc.

A set of objectives to be achieved or optimized by the system can be defined (step 150). Such objectives can be complementary in nature, or they may conflict with each other. For example, objectives defined for the system for modeling traffic flow can include minimizing accidents and/or traffic fatalities, minimizing average time spent waiting at an intersection, maximizing overall traffic throughput, etc.

The system can then be analyzed using a multi-objective evolutionary procedure or algorithm to allow the agents to interact and evolve the system (step 160). Such procedure or algorithm can include, e.g., a genetic algorithm or other appropriate computational procedure. Because of the stochastic nature of the agent behavior, a single system using the same system parameters and candidate set of variables may be simulated or evolved a plurality of times to generate some averaged behavior. Such repeated simulations can help to reduce the effect of the stochastic behavior, and provide a better estimate of the most likely behavior of the system. The fitness of a particular solution (e.g., a particular set of system variables) can be evaluated based on a mean value of the system behavior generated by a plurality of simulations. The number of times to simulate a given set of conditions can be selected based on various considerations, including complexity of the system, and variance or standard deviation of the results observed as additional simulations are completed.

The results obtained by applying the multi-objective evolutionary procedure or algorithm can be used to obtain one or more Pareto fronts, which may provide Pareto-optimal solutions that satisfy the multiple objectives. A Pareto front may be obtained for each of a plurality of evolutionary procedures or algorithms, because results for a particular system may depend on the particular procedure or algorithm employed.

When one or more Pareto fronts are obtained for a given system, robustness of the fronts may optionally be assessed (step 170). Such robustness may be desirable for certain systems, as it can lead to lower variance of results (e.g., more certainty) with respect to unknown or uncontrollable interactions, situations, etc. The robustness may be estimated, e.g., based on a standard deviation associated with the behavior that is calculated for a plurality of simulations using a particular set of system variables.

Analysis of the Pareto fronts can then be performed, and a set of system variables associated with a Pareto front may be selected (step 180). A variety of criteria may be used for selecting a particular set of system variables, including robustness and/or prioritization of certain objectives over other ones.

A general multi-objective optimization problem using minimization of a function can be expressed as follows:

$$\min F(x) = [f_1(x), f_2(x), \ldots, f_M(x)]$$

$$\text{subject to } \epsilon(x) = [e_1(x), e_2(x), \ldots, e_L(x)] \leq 0$$

$$x_i^{(L)} \leq x_i \leq x_i^{(U)}, i = 1, \ldots, N, \quad (1)$$

where $x = (x_1, x_2, \ldots, x_N)$ can represent a vector of N decision variables, M can represent a number of objectives $f_i$, L can represent a number of constraints $e_j$, and $x_i^{(L)}$ and $x_i^{(U)}$ can represent a lower and upper bound, respectively, for each decision variables $x_i$.

Two different solutions of the set of equations shown in Eq. (1) can be compared using the concept of dominance, which may induce a strict partial order in the objective space F. For example, a solution a can be said to dominate a solution b if it is better or equal in all objectives, and better in at least one objective. For a minimization analysis, the following relationships may apply:

$$\mathcal{F}(a) \prec \mathcal{F}(b) \text{ iff } \begin{cases} f_i(a) \leq f_i(b) & \forall i \in 1, \ldots, M \\ \exists j \in 1, \ldots, M & f_j(a) < f_j(b) \end{cases} \quad (2)$$

An example of a multi-objective optimization can be described for a large scale emergency response plan, such as that described in an example herein below. Multiple objectives which may be defined for such a system can include, e.g., minimizing the number of casualties (affected people) and/or fatalities (mortalities), minimizing the average ill-health of the total population, minimizing the average waiting time at the hospitals, maximizing the average time taken by a person to die (so as to increase the chance for external help to arrive), maximizing utilization of resources at different locations (so that no one location runs out of critical resources), etc. Tangible economic, legal and/or ethical issues may also be formulated to provide further classes of objective functions. Each of these objective functions can optionally be assigned a weight to indicate the relative importance of achieving each individual objective.

Thus, a multi-objective system to be optimized can be defined using the following exemplary attributes: selected input parameters of the model can represent decision variables to be optimized for optimization of the system as a whole, criteria for plan evaluation can represent objectives, parameter ranges can represent variable bounds, and mutual relations between the set of parameters can represent constraints. For example, the optimization problem can be investigated as a two-objective optimization problem, where a first objective can be coupled with a second objective, and then with a third objective, etc.

A number of multi-objective evolutionary algorithms ("MOEAs") or procedures have been described in publications. MOEAs are described, e.g., in Kalyanmoy Deb, "Multi-Objective Optimization Using Evolutionary Algorithms," John Wiley & Sons, Inc., New York, N.Y., USA (2001). Such techniques can be of interest to researchers and modelers because they may be capable of: (i) generating multiple Pareto-optimal solutions in a single run of an algorithm, (ii) handling a large search space, and (iii) being robust with respect to the effects of noise. Moreover, MOEAs have been successfully applied to several real world problems such as: protein folding as described, e.g., in V. Cutello et al., "A multi-objective evolutionary approach to the protein structure prediction problem," Journal of The Royal Society Interface, 3(6):139-151, (February 2006); circuit design as described, e.g., in T. Biondi et al., "Multi-objective evolutionary algorithms and pattern search methods for circuit design problems," Journal of Universal Computer Science, 12(4):432-449 (2006); safety related systems as described, e.g., in R. M. Everson and J. E. Fieldsend, "Multiobjective optimization of safety related systems: An application to short-term conflict alert," IEEE Transactions on Evolutionary Computation, 10(2):187-198 (April 2006), etc.

Exemplary analysis of MOEAs can optionally be performed using known procedures or algorithms such as, e.g., the Nondominated Sorting Genetic Algorithm II ("NSGA-II") which is described, e.g., in Kalyanmoy Deb et al., "A fast and elitist multi-objective genetic algorithm: NSGA-II," IEEE Trans. Evolutionary Computation, 6(2):182-197 (2002). The NSGA-II is based on the use of a fast nondominated sorting technique to sort a population of solutions into different nondomination levels. It then may use elitism and a crowded-comparison operator for a diversity preservation.

A different evolutionary procedure or algorithm, such as the Pareto Archived Evolution Strategy ("PAES"), may also be used to analyze an MOEA, and the relative performance of such procedures or algorithms for the proposed problem can be compared. PAES, which is described, e.g., in J. D. Knowles et al., "Approximating the nondominated front using the Pareto archived evolution strategy," Evol. Comput., 8(2):149-172 (2000), uses a simple ("1+1") local search evolution strategy. It maintains an archive of nondominated solutions which it can exploit to accurately estimate the quality of new candidate solutions.

It may be desirable to use both NSGA-II and PAES to analyze an MOEA and compare the results because: (i) they are representative of the state-of-the-art in evolutionary multi-objective optimization, (ii) they belong to two different classes of evolutionary procedures or algorithms—Genetic Algorithms (NSGA-II) and Evolution Strategies (PAES), and (iii) their software (e.g., code) is in the public domain. A comparison of the results obtained using differing algorithms, such as these exemplary ones, may help to better optimize a system than if only one procedure or algorithm was used.

Stochasticity is an important aspect of agent-based models which include boundedly rational agents. For example, such ABMs can generally produce different results for different simulations, even when identical initialization of parameters is provided. Thus, one exemplary simulation may generally not be sufficient to evaluate a fitness function for determining achievement of one or more objectives, and such single simulation can be considered as only an estimate of the fitness.

In certain exemplary embodiments of the present invention, a Pareto front of a large scale dynamical system containing interacting agents may be estimated, and multi-objective evolutionary procedures or algorithms can be applied to optimize the solutions according to user-defined objectives or criteria. An identification of a good estimate of the observed Pareto front can be important for selection of variables to provide stable and robust system which is capable of best satisfying the objectives. Such an approach can also be combined with traditional analyses or assessments of such systems, and it can be used by domain experts to develop, test, evaluate and/or refine any plan or infrastructure of a system based on the set of identified variables.

Several constraint handling techniques have been described in order to ensure feasibility of constrained optimization. For example, the concept of a constraint objective has been described, e.g., in Zeng S Y et al., "An orthogonal multi-objective evolutionary algorithm for multi-objective optimization problems with constraints," Evolutionary computation, 12(1):77-98 (2004). Such a constraint objective may be expressed as:

$$\gamma_{co}(x) = \sum_{i=1}^{L} \min\{e_i(x), 0\}, \quad (3)$$

The standard dominance relation $\prec$ shown in Eq. (2) can be redefined as follows:

$$x_1 \overset{\wedge}{\prec} x_2 \text{ iff } \begin{cases} \gamma_{co}(x_1) < \gamma_{co}(x_2) & \text{or} \\ \gamma_{co}(x_1) = \gamma_{co}(x_2) & \text{and } \mathcal{F}(x_1) \prec \mathcal{F}(x_2) \end{cases}, \quad (4)$$

where F can represent a set of objectives. In this exemplary manner, the constraint objective may have the highest priority, and it may not be necessary to check the feasibility of solutions obtained during evolution of the procedure or algorithm. Both NSGA-II and PAES dominance relationships can be modified according to Eq. (4).

It is possible to use a real-valued representation for both of these exemplary algorithms which may be executed in accordance with exemplary embodiments of the present invention. In particular, for NSGA-II, it is possible to use a conventional simulated binary crossover ("SBX") and polynomial mutation, with probabilities and distribution indices represented, e.g., by $p_c$=00.9, $h_c$=10 and $$p_m = \frac{1}{N},$$

$h_m$=20 respectively. When using the PAES algorithm, the mutation operator can select a decision variable $x_i$ with probability $$p_m = \frac{1}{N}$$

and mutate it according to the following relationship: $x^*_i = x_i + N(0,0,1) \times (x_i^{(U)} - x_i^{(L)})$. Here, $N(0,0,1)$ can be a real number generated by a Gaussian distribution having a mean $\mu$=0 and standard deviation $\sigma$=0.1.

Each of the exemplary procedures or algorithms can be executed, e.g., for a maximum of 4,000 fitness function evaluations. When using the NSGA-II procedure or algorithm, it may be possible to use, e.g., a population of 40 individuals and run the algorithm for 100 generations. When using the PAES procedure or algorithm it may be possible, e.g., to use, e.g., an archive size $\alpha$=100, depth parameter d=4, and run the procedure or algorithm for 4,000 iterations. The final population obtained using the NSGA-II procedure or algorithm may then be compared with the final archive obtained using the PAES procedure or algorithm.

Because of the model stochasticity, a single fitness function evaluation may generally correspond to running the model for 10 independent simulations and calculating the mean value as an estimate of the fitness. Thus, 40,000 model simulations can be executed for each run of the procedure or algorithm. As described herein, in order to handle these computational requirements, which may be significant, the ProActive library can be used in order to run each of the simulations in a different node of a computational cluster. The production of a single Pareto front for a complex system can use, e.g., about 5 days in a computational cluster. However, this exemplary procedure can be performed automatically, in contrast to conventional calibration techniques which are generally performed manually. Also, the computation of the Pareto front can assist in elucidating the underlying dynamics, interaction complexities and emergent properties of the system, in addition to actually optimizing the objective functions.

Attempting to characterize the dynamics of all active agents in a complex system can lead to partial differential equations that can be difficult to solve. This exemplary process can become even more perplexing when the agents are mobile and embedded in a highly interconnected environment. Studying the dynamics of the objectives during the iterations of an evolutionary algorithm can provide insight about their mutual interactions. An example of such evolution of objectives obtained in accordance with exemplary embodiments of the present invention are described in further detail in the examples presented herein below.

In the stochastic environment produced by an agent-based model simulator, finding a good set of solutions may not be the only aim of a multi-objective optimization process. A desirable system defined by optimized parameters should be also robust against environmental changes, and it should still work satisfactorily even if the behaviors of the involved agents are slightly changed from an optimal configuration. Such robustness can be one of the criteria for selecting solutions from the generated Pareto front. Thus, it may be desirable to directly generate a robust Pareto front. Robustness can be assessed, e.g., by using an expected fitness function based on a probability distribution $p(\delta)$ of a possible perturbation $\delta$.

The expected fitness function can be determined by averaging $f(x+\delta)$ over a number of randomly sampled points. An exemplary drawback of such an approach is that it can precipitously worsen the computational complexity of the algorithm, and thus may not be readily applicable to real-world problems where the calculation of the fitness function is particularly expensive or time-consuming. A more practical solution may be to use robustness analysis as a post-processing phase in order to study the solutions in the final Pareto front. Both environmental and behavioral changes can be simulated in the model by introducing small variations to the input parameters. In particular, for each set of input parameters $x=(x_1, \ldots, x_j, \ldots, x_N)$ in the Pareto set, it may be possible to generate, e.g., M=100 random neighbors using the following rule for each decision variable $x_j$:

$$x_j = u(x_j - \delta, x_j + \delta), j = 1, 2, \ldots, N$$

$$\text{where } \delta = \alpha \times (x_j^{(U)} - x_j^{(L)}), \quad (5)$$

where $u(a,b)$ is a uniform random number generated in the range [a,b] and $\alpha$ is a parameter that controls the extent of the desired robustness. In order to evaluate the neighbors, an averaged fitness estimation over, e.g., 10 simulations can again be used, so that, e.g., 1000 model simulations are utilized to evaluate the robustness of each point on the Pareto front. For example, solutions with lower standard deviation can be preferred, but this information should be combined with additional higher-level knowledge that can be extracted, for example, by analyzing the emergent dynamics produced by the selected solutions.

A constrained multi-objective formulation of the problem of finding "good" system variables has been described herein which can use agent-based modeling technology for dynamic simulation and evolutionary procedures or algorithms to obtain approximated Pareto fronts. Such formulations in accordance with certain exemplary embodiments of the present invention can be used to generate estimated Pareto fronts of optimal solutions at reasonable computational expense. For example, exemplary embodiments of the present invention may be applied to any agent-based model. Such applications may likely be most beneficial in models involving societies of agents exhibiting probabilistic and/or stochastic rules of behavior, where the global dynamic can be evaluated by different and conflicting objectives.

In addition to the exemplary embodiments and exemplary models described in detail herein, additional exemplary features may be incorporated in analysis of complex dynamical agent-based models with multiple objectives, such as, e.g.:

(a) studying the performance and scalability of the proposed algorithms using 3 or more objective at the same time;
(b) introducing the robustness search directly inside the evolutionary algorithm, with minimal increase to its computational complexity (e.g., using the information already available within the population);
(c) using the stochastic properties of the fitness function evaluations to guide the selection/creation of the next generation of solutions (e.g., the same point may be treated as two different points corresponding to its extreme fitness function evaluations);
(d) using the stochastic variations as a measure of robustness during the computation of the next generation; and
(e) using the running mean and standard deviation to dynamically decide the number of simulations necessary to statistically validate the fitness function evaluation (e.g., if the first 3 runs do not produce significant variations, it may not be necessary to perform all the 10 runs.).

The combined use of the agent-based modeling paradigm, multi-objective optimization and statistical analysis, can offer a promising way to study, understand and analyze the dynamics of a complex system.

Systems which may be analyzed using the exemplary embodiments of the present invention can include, e.g., traffic control, where agents may include, e.g., cars, trucks, traffic lights, and streets. The exemplary agent parameters can include: Cars and trucks—origin, destination, speed, size, and knowledge of area, GPS access; Traffic lights—location, time of green phase, time of red phase; and Streets—speed limit, size (e.g., number of lanes and lane width), location, one-way status. Exemplary goals to be optimized may include traffic flow on a specific route, minimization of traffic jams in general, reducing average traffic speed, increasing overall vehicular throughput, etc.

Exemplary embodiments of the present invention can also be used to analyze and optimize marketing activities. Exemplary agents can include persons (consumers), vendors/retailers/stores, and advertisers (e.g., television and radio, the Internet, billboards and flyers, etc.). Exemplary agent parameters can include, e.g., age, resources (money), interest, malleability, and usage/awareness of media for consumers; cost, target audience, and accessibility within target audience for advertisers. Exemplary vendor parameters can include, e.g., cost, size, accessibility, and availability of product. Exemplary system parameters can include, e.g., number of consumers, target area, number of vendors, and number of advertisers. Exemplary optimization goals can be, e.g., maximizing sales while minimizing advertising costs, increasing product availability, maximizing target market penetration, etc.

Military systems may also be studied in a similar manner. Exemplary agents can include, e.g., troops, civilians, weapons, ammunition, military bases or camps, and targets. Exemplary agent parameters can include, e.g., civilian health and location/population density; troop location, health, rank and affiliation; weapon cost, placement, range, and destructive ability; ammunition cost, availability, and portability; base location, capacity for troops and equipment, resistance to attack, etc.; and target location, mobility, size, etc. Exemplary system parameters can include, e.g., population density, number of friendly and unfriendly troops in a target area, and number and importance of targets. Exemplary goals to be optimized can include, e.g., maximizing destruction of targets and enemy weapons/bases, minimizing friendly troop casualties, minimizing use of weapons and ammunition, minimizing civilian casualties, etc.

Example: Planning with Large Agent-Networks against Catastrophes ("PLAN C")

Exemplary embodiments of the present invention can be used for searching and selecting emergency response plans in disaster management scenarios. A selection of such plans can involve, e.g., the problem of adjusting the controllable parameters in the interaction between different classes of agents (e.g., hospitals, persons, on-site responders, ambulances, etc.) and available resources, in order to minimize the negative consequences of a catastrophic event.

Comprehensive multi-agent models for simulating large-scale urban disasters have been described in, e.g., V. Mysore et al., "Multi-agent modeling and analysis of the Brazilian food-poisoning scenario," The Agent 2005 Conference on Generative Social Processes, Models and Mechanisms, Chicago (2005); V. Mysore et al., "Agent modeling of a sarin attack in Manhattan," Proceedings of the First International Workshop on Agent Technology for Disaster Management," ATDM, pp. 108-115 (2006); and G. Narzisi et al., "Complexities, catastrophes and cities: Unraveling emergency dynamics," International Conference on Complex Systems (ICCS) (2006).

The performance of a candidate disaster response plan can be evaluated based on the output of the system, according to different user-specified criteria. Such a problem can be formulated as a constrained MOOP, and multi-objective evolutionary algorithms ("MOEAs") can be effectively used to produce approximated Pareto fronts of "good" preparedness and response plans.

Provided below is a detailed description of an exemplary embodiment of the present invention, which can be used to formulate, analyze and optimize the Planning with Large Agent-Networks against Catastrophes ("PLAN C") model and its main features. An exemplary description of the major concepts of multi-objective optimization is also provided to demonstrate formulation of the problem of searching for good plans using the PLAN C model as a constrained MOOP. Further, the use of multi-objective evolutionary procedures or algorithms is described for the proposed optimization problem. In addition, exemplary experimental results are provided.

An effective response simulation in an urban environment can utilize a large number of actors (i.e., agents), each with their own skills, objectives, behaviors and resources, whose efforts can be coordinated in order to mitigate the harmful outcome of a disaster. The complex interactions between the affected population and the available resources of a response plan are poorly understood, and lie beyond the analytical capability of traditional modeling tools. ABMs provides a natural way to describe such systems, where the global dynamics result from the behavior of populations of autonomous agents operating under a fixed set of rules based on local information.

ABMs can provide a powerful simulation technique for analyzing large-scale urban disasters. A multi-agent based disaster simulation framework, built on top of the Java version of RePast 3.1 is described, e.g., in M. J. North et al. "Experiences Creating Three Implementations Of The RePast Agent Modeling Toolkit," ACM Transactions on Modeling and Computer Simulation, 16(1):1-25, (2006). Such exemplary model can be configured to simulate catastrophic scenarios (e.g., a chemical agent release, a bomb explosion, food poisoning, a smallpox outbreak). Agent-based disaster simulations can include the following exemplary features:

(a) large number of agents belonging tone of, e.g., five different classes: Person, Hospital, On-Site Responder, Ambulance and Catastrophe;

(b) large number of parameters for describing the agents' behavior and interactions;

(c) several communication channels for information (e.g., health/resource levels, hospital operation mode, etc.) which may be exchanged between similar and differing agents;

(d) modeling of the Person agent as a selfish and boundedly rational being, with stochastic personality traits emulating panic behavior;

(e) realistic models of medical/responder units and catastrophe agent effects (e.g., disease prognosis and dosage response), which may be validated by medical, sociological and/or legal experts or by historical or other data;

(f) modeling of the Person agent as a selfish and boundedly rational being, with stochastic personality traits emulating panic behavior;

(g) integration of topological and transportation constraints via publicly available Geographic Information System (GIS) data such as, e.g., that of Manhattan island in New York City; and (h) computer software for parallel and distributed concurrent computing on large-scale clusters of workstations which may be achieved, e.g., using an integration between ProActive (as described, e.g., at http://www-sop.inria.fr/oasis/proactive/) and RePast.

Table 1 below shows the main exemplary parameters and their possible ranges used to model the PLAN C system. Some of these exemplary parameters capture the environment, e.g., the probability of being able to make a telephone call, but most of them influence the rules of behavior of the involved agents. These exemplary parameters can have different natures—e.g., some of these exemplary parameters can be selected based on known data or proposed resource allotments. For example, the number of hospitals, ambulances and on-site responders can be set according to real data for such resources in Manhattan. Other parameters may remain variable due to scarce knowledge about their real-world values or usage. For example, the "unsafe health level" can represent the health level at which a person chooses to head to a hospital. This exemplary parameter can play an important role in the dynamics of the system, especially in the distributed utilization of the available resources, but it's best or preferred value may not be precisely known a priori.

According to the afore-mentioned considerations, ten controllable system parameters can be identified from the list in Table 1 for use in the optimization process. These controllable parameters are marked with an asterisk in Table 1. Some of these parameters can be associated with a linear ordering that should not be violated. For example, the following relations can be used to constrain certain parameter relationships from Table 1: $p_1 < p_6 < p_7$, $p_2 < p_7$, $p_9 < p_8$.

TABLE 1

Main model parameter descriptions for the PLAN C system.

| Agent | Description | Id. | Range |
|---|---|---|---|
| Person | Critical health Level[*] | $p_1$ | [0, 1] |
| Person | Unsafe health level[*] | $p_2$ | [0, 1] |
| Person | Probability of having a communication device[*] | $p_3$ | [0, 1] |
| Person, Ambulance | Phone update probability[*] | $p_4$ | [0, 1] |
| On-site Responder | Dischargeable health level[*] | $p_5$ | [0, 1] |
| Hospital | Noncritical health level[*] | $p_6$ | [0, 1] |
| Hospital | Dischargeable health level[*] | $p_7$ | [0, 1] |
| Hospital | Low resource level (%)[*] | $p_8$ | [0, 100] |
| Hospital | Very low resource level (%)[*] | $p_9$ | [0, 100] |
| Hospital | Low beds level (%)[*] | $p_{10}$ | [0, 100] |
| Hospital, Ambulance, On-Site Responder | Alert time (in minutes) | | [0, ∞] |
| Catastrophe | Percentage of lethal, severe, light, injuries | | [0, 100] |
| User | Maximum number of iterations | | [0, ∞] |
| User | Number of agents of each class | | [0, ∞] |

The probability of having a communication device and the probability of being able to communicate using it may be "controllable" in the sense that emergency preparedness can involve improving communication infrastructure, including providing a certain number of communication devices having a particular quality (e.g., resistance to breaking down or losing electrical charge). However, it is not always clear what the cost-to-benefit ratio is for such a utility. The exemplary embodiments of an optimization procedure according to the present invention can help shed light on this issue.

As an exemplary simulation scenario, a possible terrorist attack with a warfare agent, like Sarin gas, occurring at the Port Authority Bus Terminal in the island of Manhattan was simulated. For example, an affected population of 500 individuals was considered, with 5 on-site responder units and 10 ambulances. The 28 major hospitals were also included, with their location and capacity initialized based on real data. The ambulances and on-site responders were activated 30 minutes after the attack, to account for the real approximate delay between the attack and the first emergency call. The probability distributions for lethal, severe injuries, light injuries, and no symptoms immediately following the attack were set at 0.1, 0.35, 0.40, and 0.15, respectively. Each model simulation was carried out for 1000 ticks, corresponding to the first 16 hours after the attack.

This exemplary PLAN C model can produce, as its output, individual traces of all its agents and statistical information about the time-course of the global behavior. In accordance with an exemplary embodiment of the present invention, the three criteria presented in Table 1 can be investigated and analyzed, e.g., the percentage of fatalities, average ill-health of the affected population (at the end of 16 hours), and the average waiting time at the hospitals (during the first 16 hours). Persons in perfect health (i.e., those having a health parameter value of 1.0) were excluded in the computation of this average. To solve the multi-objective optimization problem, the dynamical system model can be investigated as a two-objective optimization problem, where the percentage of fatalities is coupled first with the average ill-health and then with the average waiting time.

Exemplary embodiments of the present invention were used to estimate the Pareto front of the PLAN C large-scale emergency response planning problem, using simulations to determine effectiveness of the candidate plan on the targeted catastrophic scenario (e.g., represented as a set of input parameters to the model), and multi-objective evolutionary algorithms to optimize the solutions according to the defined objectives or criteria. Identifying a good estimate of the observed Pareto front can be important for identifying a stable and robust plan which best satisfies the objectives. Results of this analysis can be used by to develop, test, evaluate and refine public health policies governing catastrophe preparedness and emergency response infrastructures.

In the exemplary PLAN C model, the stochasticity can be an important aspect that may be handled carefully. For example, two different simulations can generally bring slightly different results even with the same initialization of parameters. It follows that one simulation is not enough to evaluate the fitness function, and can only be considered as an estimate of the fitness. In order to analyze the stochasticity of the PLAN C model, the error rate in the estimation of the different analyzed objectives with respect to a "true" fitness value estimated on 1000 independent executions was calculated. These results are shown in Table 2. As expected, the stochasticity is different for each objective/criterion: the number of fatalities and the average waiting time appear to be more sensitive to the stochastic behavior than the average ill-health. As a compromise between the quality of the approximation and the computational burden, 10 simulation runs were used for the fitness evaluation shown in Table 2.

TABLE 2

Principal results obtained using the PLAN C model.

| No. of Runs | % of Fatalities | Avg. Ill-health | Avg. Waiting Time |
| --- | --- | --- | --- |
| 1 | 11.53% | 2% | 27.41% |
| 5 | 3.57% | 0.87% | 8.21% |
| 10 | 1.14% | 0.82% | 6.63% |
| 50 | 1.09% | 0.19% | 1.84% |
| 100 | 0.26% | 0.054% | 1.83% |

Two exemplary evolutionary procedures or algorithms, NSGA-II and PAES, were used to obtain Pareto fronts for the PLAN C model system. Before presenting comparative results for these two algorithms, it can be important to validate experimentally the exemplary multi-objective approach used in accordance with exemplary embodiments of the present invention. It is reasonable to allow some degree of trade-off or compromise, for example, between the number of fatalities and the average ill-health of the population at the end of a response plan. However, attempting to characterize the specific dynamics of all involved agents in a complex system can lead to unwieldy sets of partial differential equations that may be difficult, if not impossible, to solve. The complexity increases when such agents are mobile and operate within a highly interconnected environment such as an urban area.

Figure 2:
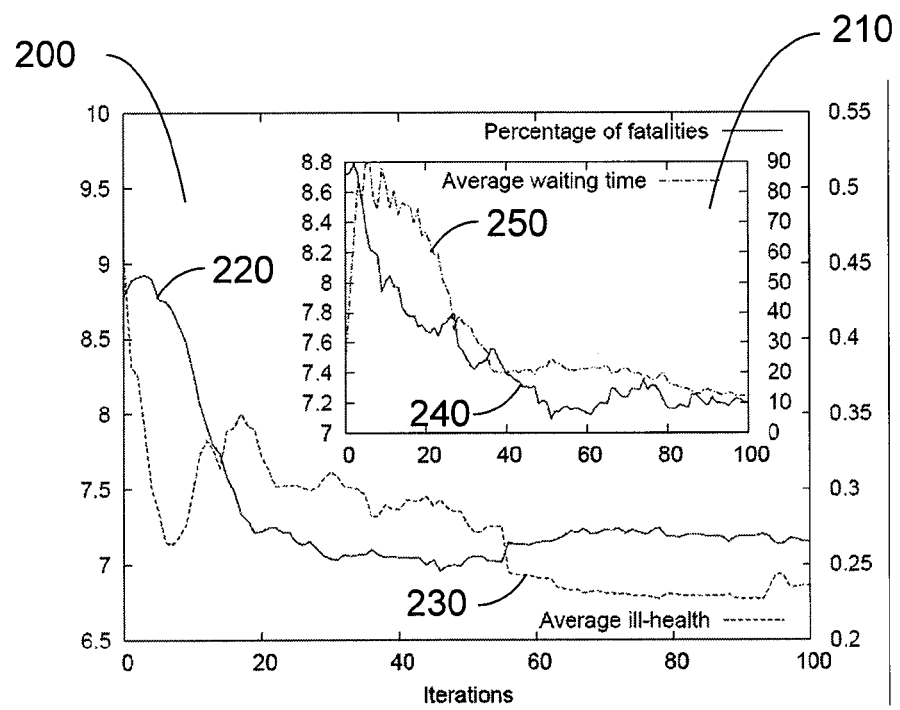
FIG. 2 is an exemplary graph showing exemplary NSGA-II mean evolution curves for exemplary two-objectives problems, where the left y-axis range represents the percentage of fatalities (e.g., both plots), and the right y-axis range represents average ill-health (e.g., main plot) and the average waiting time (e.g., inset plot)

Analyzing the dynamics of multiple objectives during the iterations of an evolutionary algorithm can provide insight about their mutual interactions. For example, FIG. 2 shows the mean evolution curves of the population of NSGA-II for the two pairs of objectives analyzed, percentage of fatalities 220 vs. average ill-health 230, and percentage of fatalities 240 vs. average waiting time 250, as shown in main plot 200 and inset plot 210, respectively. In both graphs 200, 210, a conflict scenario is shown, e.g., an improvement of one objective is generally accompanied by a worsening in the other, but the interaction during the evolution produces a global minimization of both objectives. This effect is more evident in the main graph 200 of FIG. 2, where the percentage of fatalities 220 is plotted against the average ill-health 230, than in the inset graph 210 of FIG. 2, which compares the percentage of fatalities 240 to the average waiting time 250.

Figure 3:
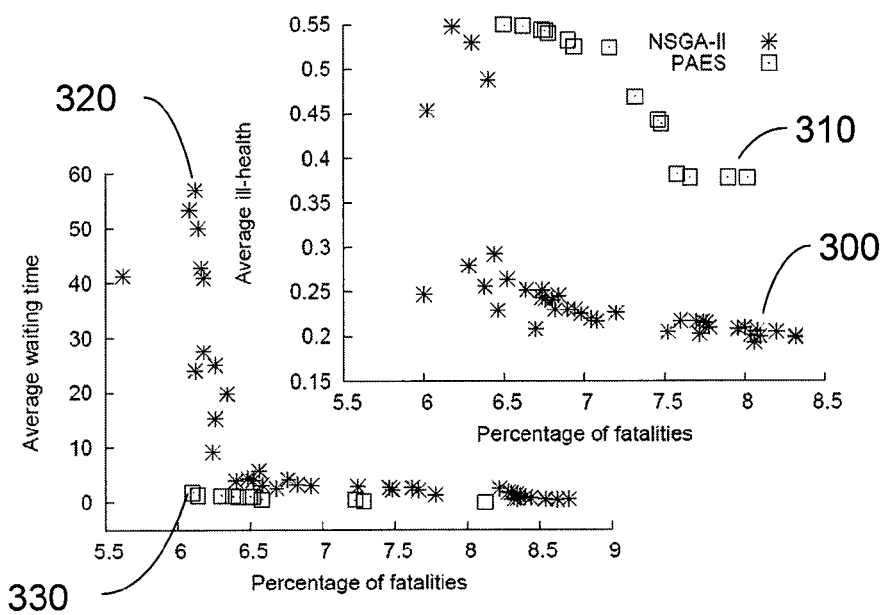
FIG. 3 is an exemplary graph showing a comparison between final Pareto fronts obtained by the NSGA-II and PAES algorithms, using the exemplary two-objectives problems studied.

FIG. 3 shows the final Pareto fronts 300, 310 obtained using the NSGA-II and PAES procedures or algorithms, respectively, for the percentage of fatalities and the average ill-health objectives. The NSGA-II algorithm appears to generate a better set of solutions than the PAES algorithm, both in terms of the quality and the spread. Although it is possible to specify an archive size of 100 elements when using the PAES algorithm, the final set is composed of only 15 solutions. This result suggests that the PAES algorithm may be less suitable for maintaining a good level of diversity in the archive and that it may have been trapped in a local minimum.

FIG. 3 also shows the exemplary final Pareto fronts 320, 330 obtained using the NSGA-II and PAES algorithms, respectively, for the percentage of fatalities and the average waiting time objectives. Although the PAES algorithm results exhibit slightly better solutions then those obtained using the NSGA-II algorithm, the final set 330 again includes only 11 solutions. Moreover, all these solutions are spread along the percentage of fatalities axis, in contrast with the NSGA-II algorithm results 320 that produced additional solutions with low percentage of fatalities along the average waiting time axis.

In one exemplary embodiment of the present invention, the influence of the "unsafe health level" and the "low resource level" parameters on the three defined objectives may also be assessed. The "unsafe health level" parameter has been described herein above. The "low resource level" parameter is the level below which a hospital changes its mode of operation from "available" to "critical" (e.g., such that only critically ill persons are admitted thereafter). A conventional analytic approach may be to explore the parameter space generated by the possible ranges of these parameters in a systematic way. For example, if 30 uniformly distributed points are used for each range, a Cartesian product of 900 pairs can be obtained and evaluated. Using, e.g., 10 simulations for each configuration can lead to 9,000 model simulations to evaluate the ranges of only two parameters. (With three parameters, the computation would use 27,000 model simulations, which may be impractical). By following this brute-force approach, the minimum percentage of fatalities obtained was 8.54 using an unsafe health level of 0.33 and a low resource level of 96%, but these parameters resulted in an average waiting time at the hospital of 187 minutes.

Using the multi-objective approach in accordance with exemplary embodiments of the present invention, another possibly better solution may be found which can further reduce the average waiting time at the hospital as well. Such a set of solutions is shown, e.g., in FIG. 2. For example, one such solution produced 6.2% of fatalities with a waiting time at the hospital of only 15 minutes, using an unsafe health level of 0.13 and a low resource level of 28. A practical interpretation of these numbers is that people should be advised to go to the hospital as soon as possible, and the hospital should work in critical mode only when its resources are below 28%. This behavior is facilitated by a specific combined setting of all the other parameters, as discovered by the genetic algorithmic search. For example, the dischargeable health level for the hospital is set to 0.2, meaning that patients may be discharged even if they are still sick, because they have a high chance to survive with the short treatment received at this health level. This particular global dynamic results from the simultaneous multi-objective optimization of all the model parameters, which permits the study of their mutual interactions in a reasonable amount of computational time.

Figure 4:
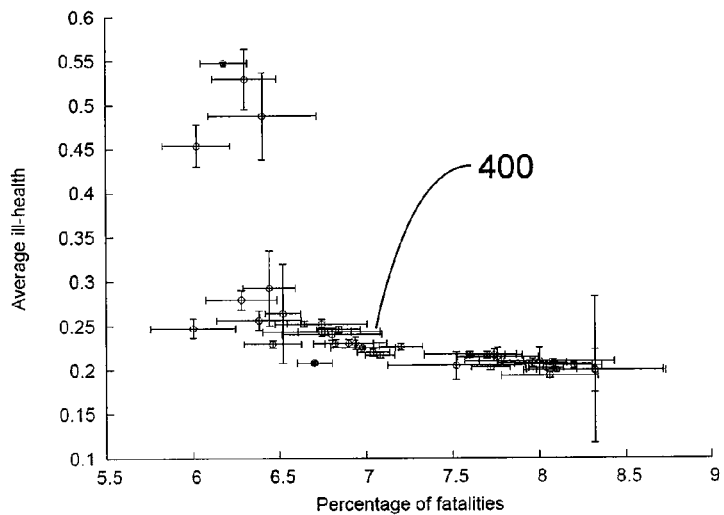
FIG. 4 is an exemplary graph of a robustness of the Pareto front, where error bars indicate a standard deviations relative to two objectives of 100 neighbors.

FIG. 4 shows a graph of the robustness of the Pareto front 400 obtained using the NSGA-II algorithm for the two objectives of percentage of fatalities and average ill-heath using $\alpha=0.1$. The orthogonal error bars indicate the standard deviations with respect to each objective produced by the 100 generated neighbors (in the parameter space) of each point. For example, solutions with a lower standard deviation may generally be preferred. However, such information may be combined with additional higher-level knowledge that can be extracted, for example, by running the exemplary PLAN C model and analyzing the emergent dynamics produced by the selected solutions.

Figure 5:
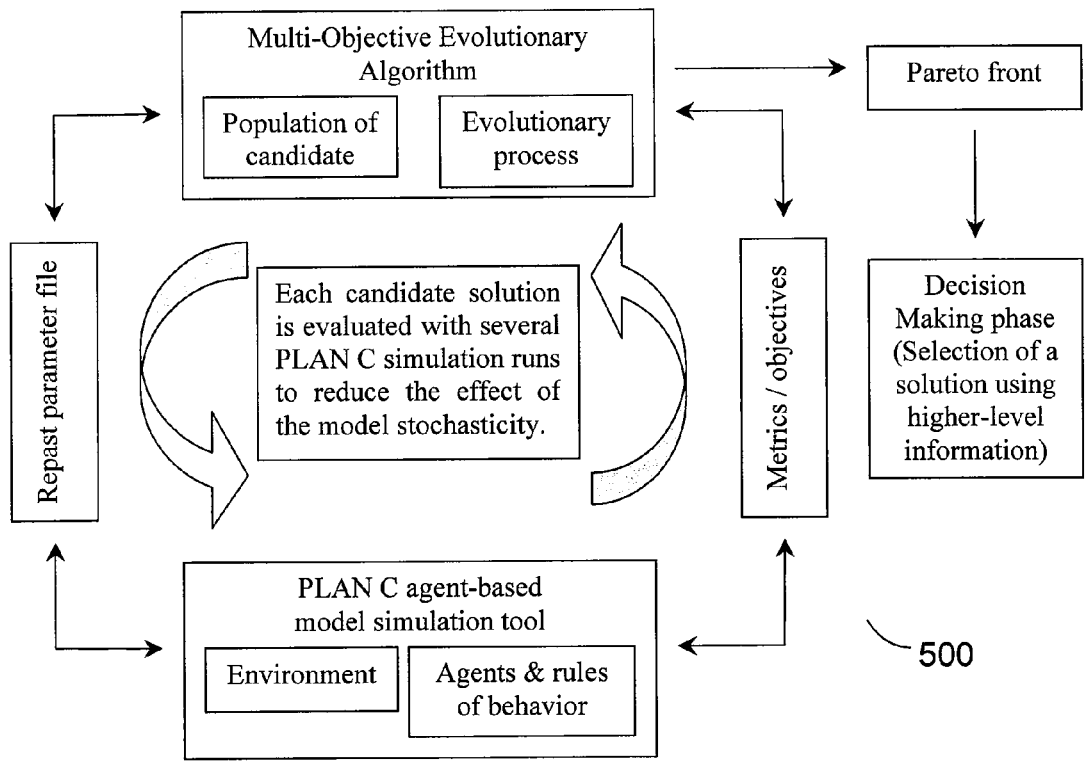
FIG. 5 is an exemplary flow diagram of another exemplary embodiment of the method according to present invention.
Figure 6:
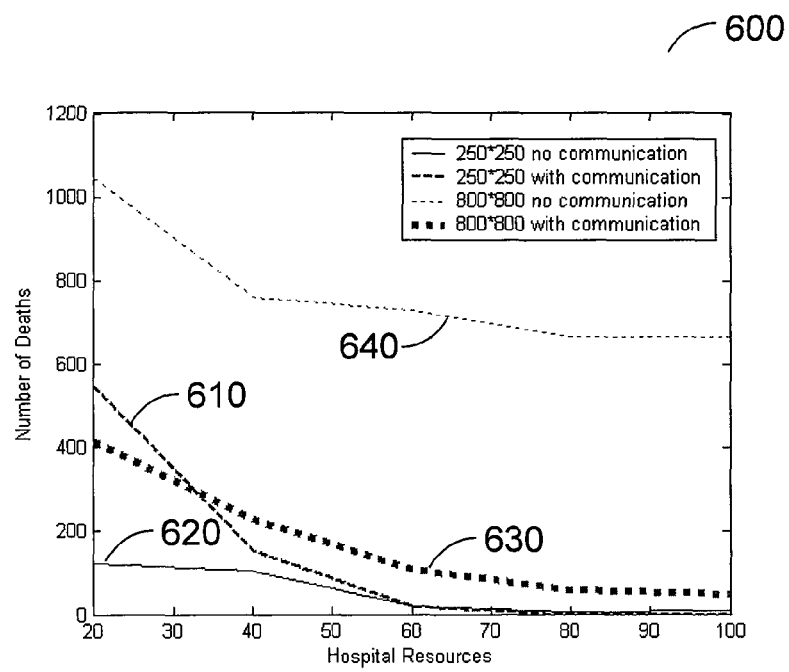
FIG. 6 is an exemplary graph of an effect of hospital resources, communication and grid-size on death-rate for the Brazilian outbreak scenario.
Figure 7:
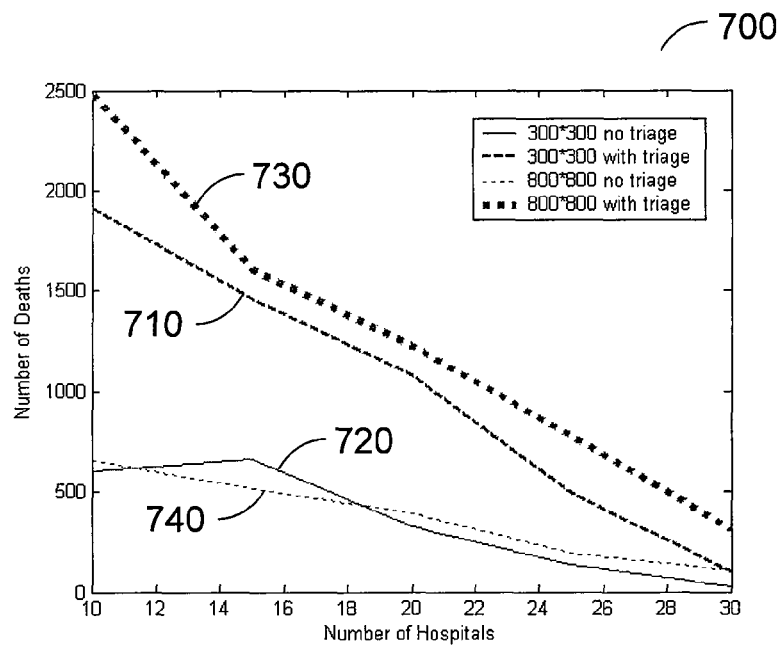
FIG. 7 is an exemplary graph of an effect of number of hospitals, triage and grid-size on death-rate for a Brazilian outbreak scenario.
Figure 8:
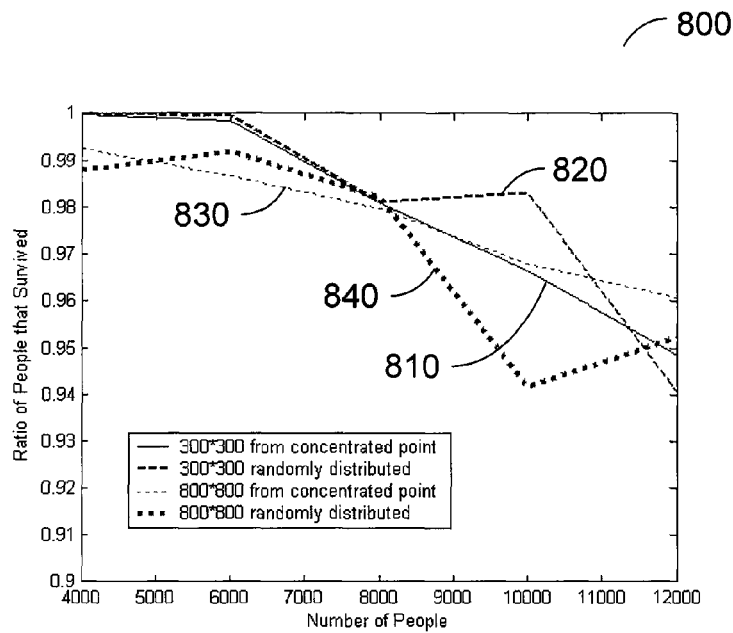
FIG. 8 is an exemplary graph is a graph of an effect of number of people, grid-size and initial pattern on survival rate for the Brazilian outbreak scenario.

An exemplary flowchart 500 illustrating the relationships between the various procedures and features of the PLAN C model and analysis according to another exemplary embodiment of the present invention is shown in FIG. 5. The procedures and steps shown in FIG. 5 are discussed in more detail herein.

Example: A Brazilian Food-Poisoning Scenario

In 1998, a massive outbreak of *Staphylococcus aureus* food poisoning occurred in the rural town of Minas Gerais, Brazil, where approximately 8000 individuals attended a Catholic priest's coronation. This event is described, e.g., in Do Carmo L. S. et. al., "A case study of a massive staphylococcal food poisoning incident," *Food borne Pathogens and Disease*, Winter:1(4):241-6 (2004). The trace-back investigation implicated food preparers, who were culture positive for enterotoxigenic *Staphylococcus aureus*, as the source of contamination. However, it was the improper storage temperature of the food, which was prepared two days in advance, in the summer weather that allowed the optimal growth of bacteria and production of SE (Staphylococcus enterotoxin).

Symptoms such as intense nausea, emesis, diarrhea, abdominal pain, prostration, and dizziness were pronounced in less than four hours after consumption of the contaminated food, in about half the population (~4000 people). Almost half of the immediately affected population (~2000 people) decided to proceed to one of the 26 nearby hospitals before letting their symptoms and condition worsen. However, this overwhelmed the various Emergency Departments, forcing a triage. A triage, in medical parlance, refers to a set of policies to partition a vast number of patients into different groups, e.g., those requiring immediate intensive care, those requiring general hospitalization, and those requiring only medication or saline. This process helps the hospital distribute the available resources optimally, under the time and resource constraints imposed by the prognosis of the disease.

In Minas Gerais, 396 people (~20% of those seeking medical assistance) preferred admission after triage, and ~20% of this group (81 people) required admission to the Intensive Care Unit (ICU). Patients with improving health were discharged from the ICU within 7-10 days. A total of 16 patients (~20% of those admitted to the ICU) subsequently developed irreversible multi-system shock and died while hospitalized. The ages of those attending the coronation ranged from 1 to 86 years old. However, the 16 fatalities occurred only in the oldest (65 years and above) and the youngest (5 years and under) groups. Sex of the patient was found to have no influence on the clinical outcome among those treated in the ICU.

Exemplary embodiments of the present invention may be used to further study and understand this massive outbreak of *Staphylococcus aureus* food poisoning that occurred in Minas Gerais, Brazil in 1998. Although the fraction of fatalities (16/8000) may not be regarded as being of catastrophic magnitude, the scenario can be well-suited for observing the effects of different instructions and policies on the behavior of large affected population and effectiveness of medical facilities.

The dynamics of such an outbreak were captured using two kinds of abstract agents—hospital and person, enhanced with information and communication channels. A hospital can represent an abstraction of any medical facility accessible in the area (of which there were 26 in the Brazilian scenario), while a person can represent an abstraction of any individual who consumed the contaminated food (e.g., 8000 in the Brazilian scenario). The effect of the general population not attending the coronation was not modeled in the simulation study described herein. The exemplary model can be enhanced with information and communication channels, with two important pieces of information being location of the hospitals and their current capacities.

After exploring a number of simulation techniques, this "outbreak" model was implemented in the Java version of RePast which is described, e.g., in Collier N. et al., "RePast 3.0: Recursive Porous Agent Simulation Toolkit," (2005) available at http://repast.sourceforge.net/. Most attributes used in this system are within the range of 0 to 1, with most of the behavior governed by random-number-based probabilities. The relative performance of the different simulations has been documented using a range of parameter values for communication channels, personalities and triage policies, to better understand their combined effect on the overall survival rates. An exemplary XSSYS trace analysis and model checking tool or system which may be used in such analysis is described, e.g., in Antoniotti M. et al., "Foundations of a Query and Simulation System for the Modeling of Biochemical and Biological Processes", *The Pacific Symposium on Biocomputing: PSB* 2003 (Eds. R. B. Altman, A. K. Dunker, L. Hunter, T. A. Jung & T. E. Klein), pp 116-127, World Scientific (January, 2003). Such exemplary tool or system can provide complex temporal logic queries over RePast traces. Further, suggestions may be provided as to how such a schema provides a reasonable way of modeling, simulating and analyzing other catastrophic scenarios as well.

Since the exemplary modeled system involves a large number of agents, uses a vast number of parameters, and attempts to capture the stochastic nature of the infection and behavior, traditional symbolic or algebraic analyses may not be feasible or even possible. Instead, simulation-based analyses can be used to obtain average performance statistics over a large number of trials. Combined with individual inspection of a small number of characteristic traces, an evaluation of the relative merits of different emergency response strategies becomes possible.

The food poisoning can be modeled using functions which describe the time-variation of a person's health, with and without treatment. Effectively, any "disease" can be modeled in terms of the (possibly time-varying) amount by which the affected agent's "health" parameter can deteriorate or recover with and without treatment, at each time step of the simulation. A specific person's resistance or susceptibility to a specific disease can be captured by an optional personalized variable, which can be used to modify the disease-health-treatment functions. Such personalized variable can be used to account for factors such as, e.g., age, sex, health condition before food consumption, and genetic makeup. Probabilities may be introduced to capture unpredictability and variability in real situations. This simple but effective abstraction for disease propagation may also be used to model other conditions such as Sarin gas attacks, radiation exposure, etc. Since the initial amount consumed and the dose/response relationship in human oral exposure to Staphylococcal enterotoxins (SE) are unknown, the initial health of each person is assumed to be a random value selected within a reasonable range.

The persons can be modeled as moving toward their place of work from the site of food poisoning. Depending on their deteriorating health level and personality parameters, they may choose to go to the one hospital they are initially aware of. Additional information can be acquired by talking to neighboring agents. A timestamp of the information is maintained, such that persons update their knowledge only if more current information is available. Further, some persons may be equipped with radios or similar devices, which can give them access to more current information about all the hospitals. People re-compute their destination hospital they should be moving toward during the simulation, based primarily on the distance to and the believed current capacity of each medical facility they are aware of. Additionally, people can be programmed to move toward the nearest free hospital, unless they are very sick and opt to go to the nearest hospital, even if they know it is full. The complexity of the model can be increased further by defining personality parameters, which can capture whether an agent chooses to go to a hospital, to talk to neighbors, to accept newly-acquired information, or to re-compute the best hospital. Group behavior can be captured by having adjacent people who are moving towards the same destination tend to wander less.

The hospital can aim to admit every person who reaches its premises, and may generally invest its resources in the order of their admittance, and in proportion to their ill-health. Hospital resources which can include, e.g., infrastructure, beds, nurses and doctors, may be recovered when a patient is discharged or deceased, while medical supplies like drugs and saline can be irrecoverable. The hospitals can also perform a local broadcast of complete current information to all persons who are admitted or waiting at their facility. The hospital model may be enriched by identifying three different modes of operation: "full," "critical," and "available," corresponding to the current amount of available resources.

With the triage policy in place, the hospital agent can handle admitted persons as before. However, it may admit new persons only if it has resources to spare (e.g., "available" mode). If it is operating in the "critical" mode, it may admit only critically ill persons. No new persons may be admitted in the "full" mode. With a transfer policy in place, admitted patients who have recovered reasonably may be discharged earlier than usual, and instructed to go to a different hospital if symptoms recur. In their place, critically ill persons who are waiting can be admitted. Probabilistic parameters may be used to capture the policies that govern hospital decisions, such as: when to admit a new patient, in which order to treat the admitted patients, when to transfer a recovering patient to a nearby hospital, and which critically ill patient to admit in the vacancy created.

A significant aspect of the exemplary disease outbreak model described herein is its extreme sensitivity and unpredictability. Thus, general average and/or comparative trends, as opposed to absolute values, in the death-rate can be used to observe the effect of variations in parameters of interest (with the other dimensions fixed at reasonable values). It is possible to obtain trends (typically averaged over three runs) based on the Brazilian scenario with 8000 people and 26 hospitals leading to a death rate of about 0.2%.

For example, exemplary embodiments of the present invention can be used to observe how the number of deaths varies with hospital resources. FIG. 6 shows an exemplary graph 600 of such data for a 250×250 grid with communication enabled 610 and disabled 620, and for an 800×800 grid with communication enabled 630 and disabled 640, and with no triage policy implemented. From the plot, it is possible to observe that the number of deaths declines when hospitals have more resources, since each hospital is able to allocate more resources (e.g., treatment) per person. In a small grid (250×250) 610, 620, where hospitals have few resources, communication may have a negative effect on treatment efficiency in the present system model. This can result from people converging to the nearest hospitals, exhausting their resources quickly. By the time a hospital runs out of resources and turns people away, they may be too sick to survive a trip to the next hospital. However, when the hospitals have significant resources, the difference in survival rates is likely negligible when communication is used versus when it is not. In the 800×800 grid cases 630, 640, the difference in distances to the closer and farther hospitals is much greater. Hence, it is more important to communicate and obtain information about nearby hospitals in the larger grid system.

It is also possible to analyze how the number of hospitals affects the number of deaths. FIG. 7 shows an exemplary graph 700 of such data obtained for a 300×300 grid with the triage policy enabled 710 and disabled 720, and for an 800×800 grid with the triage policy enabled 730 and disabled 740. One observed phenomenon may be expected based on common sense: increasing the number of hospitals decreases the death rate, as there are fewer patients per hospital. A slightly higher death rate was observed when the grid size is larger 730, 740, due to the average distance to a hospital being greater. With greater travel distances, people tend to be sicker by the time they reach the hospitals, with more persons not being able to survive the journey.

Further, the exemplary graph 700 of FIG. 7 suggests a significant result: the triage policy, as interpreted in the present model, always works against the collective welfare of the people. The failure of the triage policy can be attributed to a key aspect of the food-poisoning health function: the condition of a healthy person is just as likely to worsen as that of an already unhealthy person. Thus, the patients discharged slightly early because of the critically ill people who were waiting may fall sick again, and the critically ill persons themselves seldom recover. Also, the health of people who are refused admission (because they are not critically ill, or because the hospital is full) tends to worsen during their trip to a different hospital. The net effect is that the hospitals have to treat sicker people. This suggests that it may be wiser for people to reach the nearest hospital, and it may be preferable for the hospitals to have a system of redistributing their resources (e.g., move equipment and doctors, as opposed to moving patients).

Studies of the Brazilian outbreak performed in accordance with exemplary embodiments of the present invention can be used to observe how the number of people affects the fraction of people that survive. FIG. 8 shows an exemplary graph 800 of simulation results for a 300×300 grid 810, 820 and an 800×800 grid 830, 840, with communication enabled and the triage policy disabled. The effect of people starting at random positions in the grid 820, 840 reveals an expected trend: as the number of people increases, the fraction of people who survive declines. Similarly, the 800×800 grid data 830, 840 can result in a slightly larger percentage of the people dying because of a greater average distance to the nearest hospital. The difference in survival percentages for the concentrated and the random initial positions may not be statistically significant. This may result from the average distance between a person's starting point and the nearest hospital being roughly the same in both cases. However, the number of initial neighbors in the distributed case may be sufficient to supply the preferable information about the nearest hospitals.

The XSSYS Temporal Logic Trace Analysis system can answer Linear Temporal Logic (LTL) queries about the time course behavior of a set of traces. It was developed originally as a part of the Simpathica system, for simulating and analyzing biochemical pathways. The XSSYS system allows a user to formulate queries about multiple traces in temporal logic or English (via a Natural Language Interface). The person and hospital traces obtained using RePast can be read using the XSSYS system. These traces can reveal insightful aspects of person and hospital behavior, and may serve as a good starting point for generating new policies to be tested. Complex temporal queries linking different traces can help discover finer relationships about the underlying dynamics of the system. As described herein, it is possible to demonstrate the XSSYS Trace Analysis tool over some simple examples.

Figure 9:
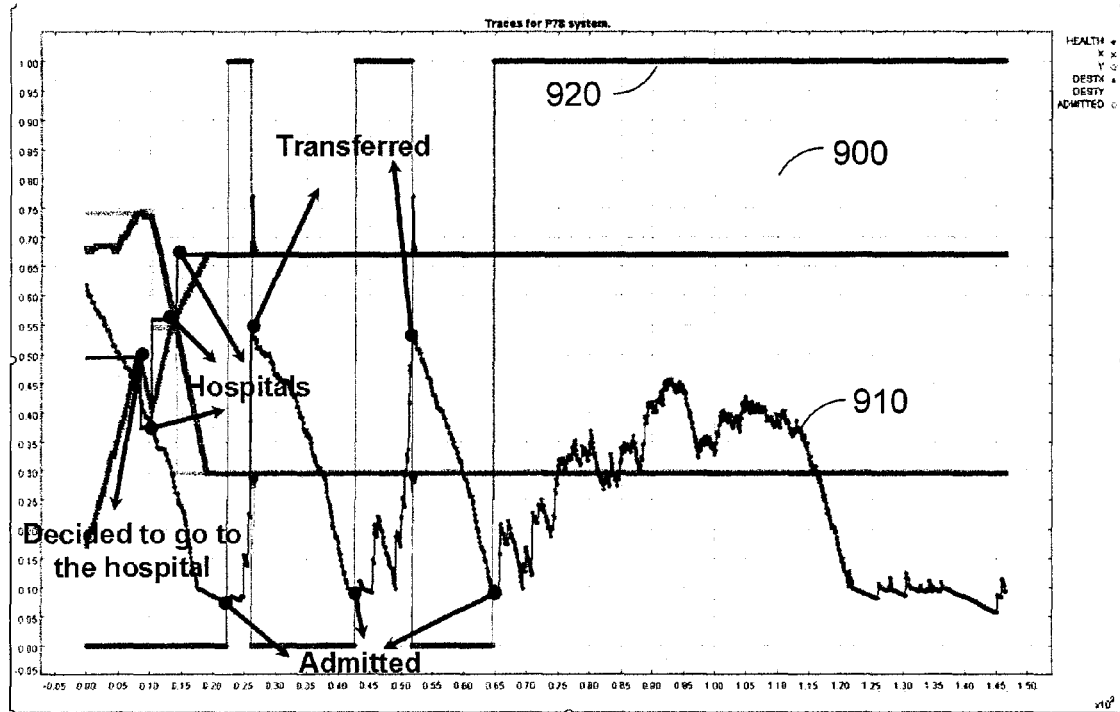
FIG. 9 is an exemplary time-trace of a person for the Brazilian outbreak scenario.
Figure 9:
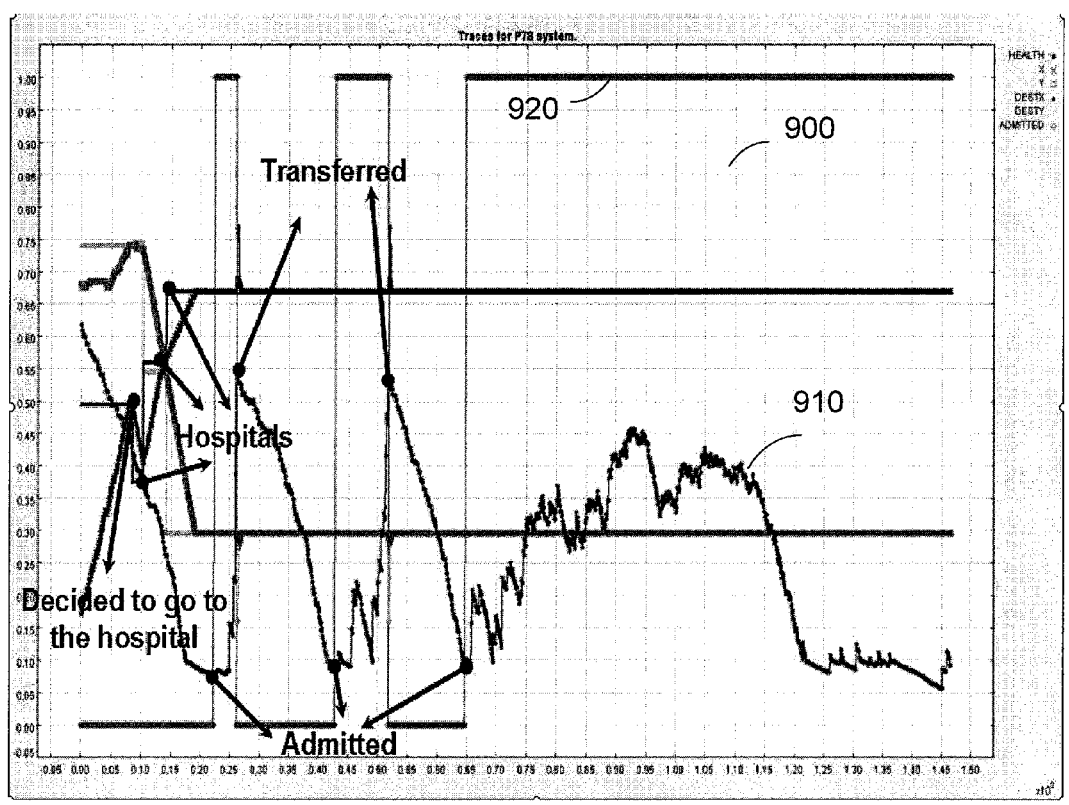

An exemplary graph 900 associated with a particular agent (here, Person-78) is shown in FIG. 9. In this graph 900, a plot of the variation of a person's health with time 910 during the course of a simulation is shown. The XSSYS system can plot this curve by using data imported from RePast in the btd format using the PtPlot tool. In addition to the health level parameter (HealthLevel) 910, a person's current location (xy) and destination (destx, desty) may be plotted in FIG. 9. To indicate when the person actually received treatment, a Boolean value, admitted 920 is also shown therein.

Figure 10:
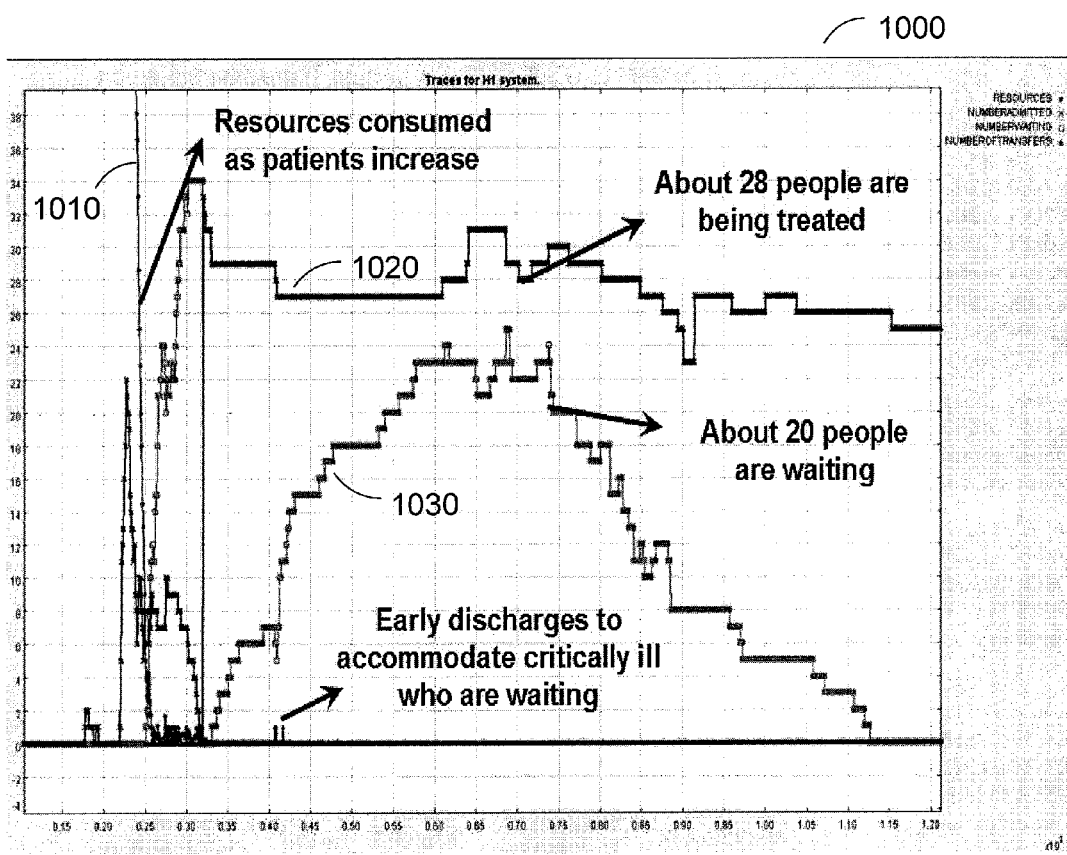
FIG. 10 is an exemplary time-trace of a hospital for the Brazilian outbreak scenario.

FIG. 10 shows an exemplary graph 1000 of the depletion of a hospital's resources (Hospital Resources) 1010 with time. The number of people admitted 1020 and the number of people waiting 1030 indicate the stress on the hospital (in this case, Hospital-1).

Figure 11:
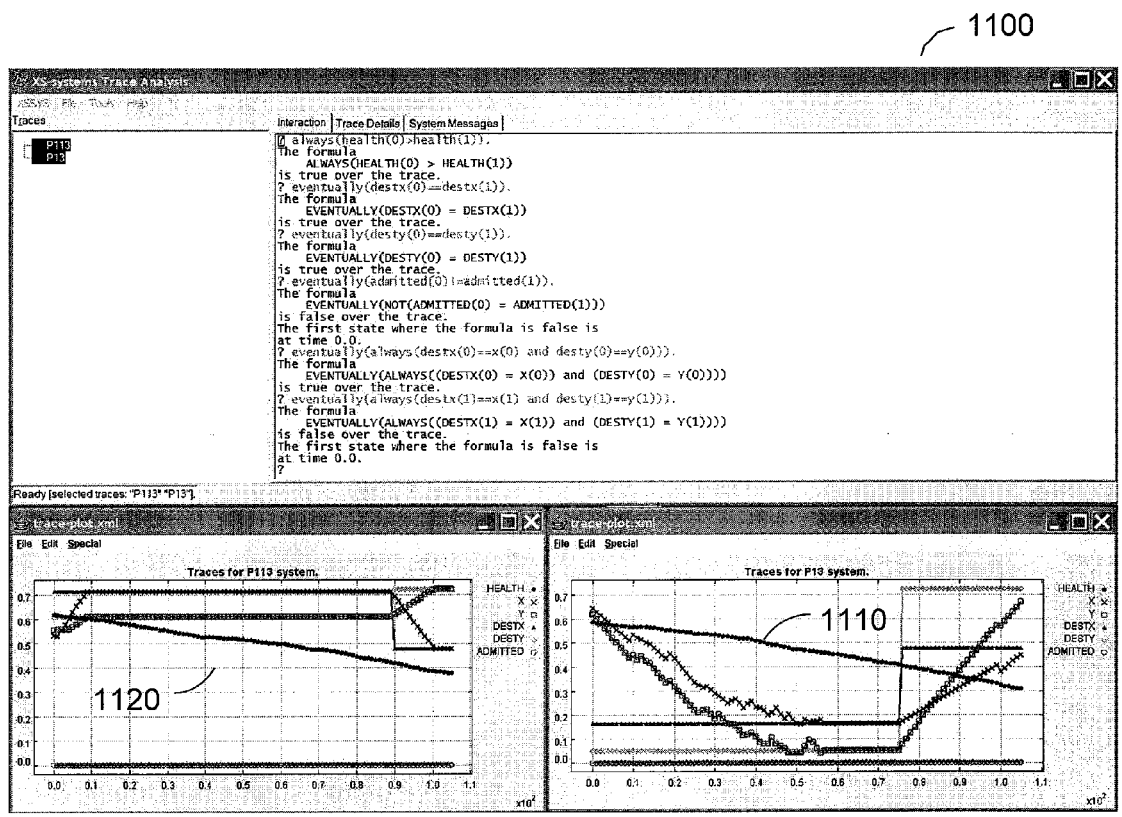
FIG. 11 is an exemplary graph of a temporal logic analysis generated by the XSSYS system in accordance with an exemplary embodiment of the present invention.

Temporal properties of these parameter traces can be analyzed by formulating queries in Linear Temporal Logic, using operators Eventually (sometime in the future) and Always (henceforth in the future). An exemplary screen shot 1100 shown in FIG. 11 illustrates such a comparison of such traces for Person-13 1110 and Person-113 1120. Person-113 1120 is seen to have consistently better HealthLevel than Person-13 1110, although both of their HealthLevels are seen to drop as time progresses. Person-113 1120 is also seen to have reached the destination hospital, while Person-13 1110 has not.

The Brazilian food-poisoning scenario is a considerably complex problem, which has all the essential elements of a typical catastrophic scenario: a large number of agents (8000+26), agents of different types (persons and hospitals), external factors governing the time-evolution of the agents' features (effect of food-poisoning on health), mobility (persons), mutual interaction (among persons, and between persons and hospitals) and multiple communication channels (talking, broadcast, and radios).

The RePast tool was shown to be sufficient to model and simulate the Brazilian food poisoning scenario. Analytical capabilities were enhanced by feeding the RePast output to XSSYS. Despite the extreme parameter sensitivity of the model, it is possible to explore the effectiveness of different emergency response strategies and catastrophe preparedness policies using exemplary embodiments of the present invention. The complexity and unpredictability of the model, due to the vast number of parameters, can be apparent.

The Brazilian outbreak model described herein was able to capture the reported statistics to a reasonable extent, and elucidated different conditions that led to these statistics. Factors that could have increased or decreased the number of fatalities also were identified. More specifically, the results showed that the distance the people need to travel to reach the hospital greatly determines how many people survive. The survival rate increases when either the resources each hospital has or the number of hospitals increases, and that the survival rate decreases when the number of people increases. When the average distance to the nearest hospital is comparable, there is almost no difference in survival rates between concentrated and random initial patterns. Communication among people about hospitals is likely beneficial when the difference in distances to hospitals is substantial, but harmful when all hospitals are close by and have few resources. The exemplary embodiment of a triage system can reduce the survival rate, since it is better to keep patients at a hospital even if it has low resources, than to transfer them to another hospital which then has to treat a sicker person. The emergence of such interesting unanticipated behaviors already suggests a potential utility of such simulation-based analysis tools.

Further enhancements to this exemplary embodiment of an outbreak model may be incorporated to make it more realistic. For example, the environment can be modeled after a real city including, e.g., transportation constraints and modes, roads, subways and other geographical information. An agent's transportation choices can also be modeled. For example, a framework for running large-scale multi-agent simulations of travel behavior based on each agent's "plan" of activities, times and preferred modes of transport is described, e.g., in B. Raney et al., "An improved framework for large-scale multi-agent simulations of travel behavior," in *Proceedings of Swiss Transport Research Conference (STRC)*, Monte Verita, CH (2004). However, the change in the transportation choices after a disaster should preferably be worked into such a "plan," with commuters and non-commuters being treated differently. Although this may appear to be a rather simple situation, it nonetheless seems to have had a major impact in the Katrina disaster as described, e.g., in K. Sono et al., "Constructing Commuters' and Non-Commuters' Action Choice Model after a Great Earthquake," *CASOS* '04 (2004). A somewhat complex model of this nature can endow each agent with a current-mobility variable, which decreases with decrease in health, increases if being assisted by a neighbor and decreases if assisting a neighbor.

It is also possible to add social networks at various levels (e.g., families, friends, etc.), and social characteristics of subsets of the population to model cultural differences in response behavior. An example of the application of social judgment theory based on group attitude emergence via assimilation and contrast effects is described, e.g., in W. Jager et al., "A dynamical perspective on attitude change," *NAACSOS conference*, Pittsburgh, USA (2004). The benefits of cooperation could be captured by increased mobility and information of agents while moving in groups. It is further possible to add social infrastructure such as, e.g., first-responders, volunteer-based relief organizations and law enforcement officers. Also, some of the people who consumed the contaminated food could belong to these special social groups, thus complicating the interaction dynamics even further.

It is also possible to add more detailed models of communication and information exchange. For instance, a logic-based framework for handling messages and belief-state changes as described, e.g., in L. Perrussel et al., "A logical Approach for describing (dis)belief change and message processing," in: *The Third International Joint Conference on Autonomous Agents and Multi-Agent Systems* (2004) could be combined with geographical divergence of knowledge via interactive-learning-based diffusion as described, e.g., in P. Morone et al., "Small World Dynamics and The Process of Knowledge Diffusion: The Case of The Metropolitan Area of Greater Santiago De Chile," *Journal of Artificial Societies and Social Simulation*, vol. 8 (2004). Such model enhancements could prove useful in capturing the realistic transmission and accumulation of information during calamities.

Long-distance 1-to-1 and 1-to-many communication channels may be incorporated into exemplary embodiments of the present invention, where 1-to-1 may be, e.g., communication between persons via cell-phone, and 1-to-many can be, e.g., from authorized broadcasters to equipped receivers. The ability to give instructions and the ability to receive instructions may be incorporated separately. Similarly, there could be a difference in transmission of different kinds of information such as, e.g.: the location of nearest hospital, the measures to slow down sickness progression and the instruction to proceed to a hospital. Such propagation of rumors and information in the context of a crisis is described, e.g., in G. C. Lawson et al., "Information Transmission Through Human Informants: Simulation," *CASOS* '04 (2004).

The food poisoning progress may also be modeled using different criteria and/or relationships. For example, the spread of *Mycoplasma pneumoniae* via interaction between patients and caregivers can be modeled using network theory as described, e.g., in L. A. Meyers et al., "Applying network theory to epidemics: control measures for Mycoplasma pneumoniae outbreaks," *Emerg Infect Dis.* 2003 February; 9(2): 204-10 (2003). Similarly, benefits and detriments of agent-based modeling versus differential equation modeling for contagion modeling are described, e.g., in H. Rahmandad et al., "Heterogeneity and Network Structure in the Dynamics of Diffusion: Comparing Agent-Based and Differential Equation Models," *CASOS* '04 (2004). An alternative approach using a stochastic agent-based model, VIR-POX, to explore the viability of available containment measures as defenses against the spread of Small Pox, which may be similar to the Brazilian scenario analysis, is described, e.g., in B. M. Eidelson et al., "VIR-POX: An Agent-Based Analysis of Smallpox Preparedness and Response Policy", *JASSS* 7 (3) (2004).

Scaling up to a very large-scale simulation through parallelization, abstraction, hierarchy and other strategies can present a computational challenge. Enhancements to the XSSYS system can be provided to improve its expressivity and power. It may be preferable to analyze the applicability of other formal reasoning techniques such as probabilistic reasoning as described, e.g., in Y. Xiang, "Probabilistic Reasoning in Multiagent Systems: A Graphical Models Approach," Cambridge University Press (2002), and probabilistic argumentation systems and causal analysis which may be provided by, e.g., the WIZER tool as described, e.g., in A. Yahja et al., "The Design of Automated Validation and Explanation for Large-Scale Social Agent Systems," *CASOS* '04 (2004).

Estimation of the triage policy parameters (e.g., the health level at which a person waiting gets deemed as critically ill, or the health level at which a recovering patient may be discharged to create a vacancy) may also be analyzed as an optimum-value computation problem. Simulations performed according to exemplary embodiments of the present invention can be formulated in a manner that is formal and accurate enough to create a meaningful simulation, but simple enough for a non-programmer to use. A survey of approaches to be modeled can be compiled, and catastrophic scenarios may be analyzed. For example, the effects of several people independently consuming botulinum-contaminated milk at their homes (following a scenario described, e.g., in L. M. Wein et al., "Analyzing a Bioterror Attack on the Food Supply: The Case of Botulinum Toxin in Milk," *PNAS*, 102(28), 9984-9 (2005)) can be modeled using a different health-modulation curve, and with people (agents) starting at their homes as opposed to congregating at a church. Transmission via various channels of an instruction to not consume any more contaminated milk may also be incorporated into the model. Thus, exemplary embodiments of the present invention can provide tools and technologies for a rigorous yet user-friendly approach for exploring assumptions about public health policies in catastrophe preparedness and emergency response.

A system according to exemplary embodiments of the present invention can be provided which includes one or more processing arrangements such as may be found, e.g., in a personal computer or computer workstation. Such system can further include a set of instructions which are capable of configuring the processing arrangement to perform the exemplary methods described herein for analyzing and optimizing multi-objective agent-based models. The instructions can be provided on a computer-accessible medium such as a storage arrangement. The storage arrangement can include, e.g., a hard drive, a CD-ROM or DVD-ROM, a tape or floppy disk, a flash drive, or any other solid-state memory storage medium.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, all publications or other documents referenced herein are incorporated herein by reference in their entireties. An appendix providing a listing of an exemplary software code that is capable of being used with certain exemplary embodiments of the present invention is attached herewith, and is also incorporated by reference in its entirety.

What is claimed is:

1. A non-transitory computer-readable medium for a multi-objective optimization of a complex dynamical system which includes thereon a set of instructions, wherein the set of instructions is configured to effectuate a processing arrangement to perform procedures comprising:
   (a) receiving a plurality of agents configured to exhibit stochastic behavior, a plurality of parameters and constraints associated with the system, a set of variables associated with the system, and a plurality of objective functions associated with the system;
   (b) determining at least one behavior of the system based on the variables, the parameters, and the constraints by applying at least one multi-objective evolutionary procedure to the agents, wherein the stochastic behavior of the agents is used to generate at least one Pareto front associated with the system through multiple simulations, wherein determination of optimization includes evaluation of robustness of the at least one Pareto front;
   (c) independently and concurrently optimizing two or more of the objective functions using the at least one multi-objective evolutionary procedure; and
   (d) selecting information of the system variables associated with at least one member of the Pareto front based on the objective functions.

2. The computer-readable medium of claim 1, wherein the agents are configured to exhibit a rational behavior.

3. The computer-readable medium of claim 1, wherein a particular one of the objective functions conflicts with another one of the objective functions.

4. The computer-readable medium of claim 1, wherein the at least one multi-objective evolutionary algorithm comprises a genetic procedure.

5. The computer-readable medium of claim 1, wherein the at least one multi-objective evolutionary algorithm is a plurality of multi-objective evolutionary procedures.

6. The computer-readable medium of claim 1, wherein the set of instructions is further configured to effectuate the processing arrangement to apply the at least one multi-objective evolutionary algorithm to the agents at a plurality of times to obtain a plurality of system behaviors.

7. The computer-readable medium of claim 6, wherein the set of instructions is further configured to effectuate the processing arrangement to determine at least one of a mean or a standard deviation associated with the behaviors.

8. The computer-readable medium of claim 7, wherein the set of instructions is further configured to effectuate the processing arrangement to determine a robustness of the behaviors based on at least one of the mean or the standard deviation.

9. The computer-readable medium of claim 8, wherein the set of instructions is further configured to effectuate the processing arrangement to select the information based on the robustness.

10. The computer-readable medium of claim 1, wherein the boundedly rational behavior is based on an incomplete information regarding the system.

11. The computer-readable medium of claim 1, wherein the at least one behavior of the system based on the variables, the parameters, and the constraints includes a plurality of behaviors, and wherein a first of the plurality of behaviors is different than a second of the plurality of behaviors.

12. The computer-readable medium of claim 1, wherein the agents are configured to exhibit a boundedly rational behavior.

13. A method for multi-objective optimization of a complex dynamical system, comprising:
    receiving a plurality of agents configured to exhibit stochastic behavior, a plurality of parameters and constraints associated with the system, a set of variables associated with the system, and a plurality of objective functions associated with the system;
    determining at least one behavior of the system based on the variables, the parameters, and the constraints by applying at least one multi-objective evolutionary procedure to the agents, wherein the stochastic behavior of the agents is used to generate at least one Pareto front associated with the system through multiple simulations, wherein determination of optimization includes evaluation of robustness of the at least one Pareto front;
    independently and concurrently optimizing two or more of the objective functions using the at least one multi-objective evolutionary procedure; and
    selecting information of the system variables associated with at least one member of the Pareto front based on the objective functions.

14. The method of claim 13, further comprising applying the at least one multi-objective evolutionary algorithm to the agents at a plurality of times to obtain a plurality of system behaviors.

15. The method of claim 14, further comprising determining at least one of a mean or a standard deviation associated with the behaviors and a robustness of the behaviors based on at least one of the mean or the standard deviation.

16. The method of claim 14, further comprising selecting the information based on the robustness.

17. The method of claim 13, wherein the boundedly rational behavior is based on an incomplete information regarding the system.

18. The method of claim 13, wherein the at least one behavior of the system based on the variables, the parameters, and the constraints includes a plurality of behaviors, and wherein a first of the plurality of behaviors is different than a second of the plurality of behaviors.

19. The computer-readable medium of claim 13, wherein the agents are configured to exhibit a boundedly rational behavior.

20. A system for multi-objective optimization of a complex dynamical system, comprising:
    a processing arrangement; and
    a computer-readable medium which includes thereon a set of instructions, wherein the set of instructions is configured to effectuate a processing arrangement to perform procedures comprising:
    (a) receiving a plurality of agents configured to exhibit stochastic behavior, a plurality of parameters and constraints associated with the system, a set of variables associated with the system, and a plurality of objective functions associated with the system;
    (b) determining at least one behavior of the system based on the variables, the parameters, and the constraints by applying at least one multi-objective evolutionary procedure to the agents, wherein the stochastic behavior of the agents is used to generate at least one Pareto front associated with the system through multiple simulations, wherein determination of optimization includes evaluation of robustness of the at least one Pareto front;
    (c) independently and concurrently optimizing two or more of the objective functions using the at least one multi-objective evolutionary procedure; and
    (d) selecting information of the system variables associated with at least one member of the Pareto front based on the objective functions.

21. The system of claim 20, wherein the set of instructions is further configured to effectuate the processing arrangement to apply the at least one multi-objective evolutionary procedure to the agents at a plurality of times to obtain a plurality of system behaviors.

22. The system of claim 21, wherein the set of instructions is further configured to effectuate the processing arrangement to determine at least one of a mean or a standard deviation associated with the behaviors, and to determine a robustness of the behaviors based on at least one of the mean or the standard deviation.

23. The system of claim 22, wherein the set of instructions is further configured to effectuate the processing arrangement to select the information based on the robustness.

24. The system of claim 20, wherein the boundedly rational behavior is based on an incomplete information regarding the system.

25. The system of claim 20, wherein the at least one behavior of the system based on the variables, the parameters, and the constraints includes a plurality of behaviors, and wherein a first of the plurality of behaviors is different than a second of the plurality of behaviors.

26. The computer-readable medium of claim 20, wherein the agents are configured to exhibit a boundedly rational behavior.

* * * * *